United States Patent [19]
Behnke et al.

[11] Patent Number: 5,750,877
[45] Date of Patent: May 12, 1998

[54] DEVICE FOR AND METHOD OF CALIBRATING THE MEASUREMENTS OF A PRODUCT STREAM

[75] Inventors: Willi Behnke, Steinhagen; Burkhard Sagemüller, Gütersloh, both of Germany

[73] Assignee: Claas KGaA, Harsewinkel, Germany

[21] Appl. No.: 740,420

[22] Filed: Oct. 28, 1996

[30] Foreign Application Priority Data

Nov. 4, 1995 [DE] Germany ................. 195 41 167.6

[51] Int. Cl.$^6$ ............................ G01F 25/00; A01D 75/18
[52] U.S. Cl. .................................................. 73/1.33; 460/7
[58] Field of Search ................................. 73/1.16, 1.33; 460/7; 56/10.2, DIG. 15

[56] References Cited

U.S. PATENT DOCUMENTS

| | | | |
|---|---|---|---|
| 1,830,311 | 11/1931 | Clark | 73/1.33 X |
| 3,226,973 | 1/1966 | Evans et al. | 73/1.33 X |
| 4,667,503 | 5/1987 | Loos | 73/1.33 |
| 5,284,046 | 2/1994 | Jensen et al. | 73/1.31 |
| 5,327,708 | 7/1994 | Gerrish | 460/7 |
| 5,343,761 | 9/1994 | Myers | 73/861.73 |
| 5,351,558 | 10/1994 | Horn | 73/861.08 |
| 5,369,603 | 11/1994 | Myers | 364/571.02 |
| 5,616,851 | 4/1997 | McMahon et al. | 460/7 X |

FOREIGN PATENT DOCUMENTS

| | | |
|---|---|---|
| 4323968A1 | 1/1994 | Germany . |
| 3933472C2 | 6/1994 | Germany . |
| 4105857C2 | 7/1994 | Germany . |
| 4318477A1 | 1/1995 | Germany . |
| 2161282 | 1/1986 | United Kingdom . |

*Primary Examiner*—George M. Dombroske
*Assistant Examiner*—Paul D. Amrozowicz
*Attorney, Agent, or Firm*—Michael J. Striker

[57] ABSTRACT

In a device for and a method of calibrating the measurement of a product stream in agricultural machines, a calibrating unit is arranged after a measuring unit, a definite quantity of a product stream is weighed in the calibrating unit and the weight value is determined in an evaluating electronic unit which compares the weight value with a value determined by the measuring unit and determines a correction factor from the comparison of both values.

30 Claims, 2 Drawing Sheets

DEVICE FOR AND METHOD OF CALIBRATING THE MEASUREMENTS OF A PRODUCT STREAM

BACKGROUND OF THE INVENTION

The present invention relates to a device for calibrating the measurements of a product stream, which is installed on an agricultural machine so that a product stream is supplied and weighed in the device to calibrate an associated product stream measuring device. The invention also relates to a respective method of calibration the measurements of the product stream.

Devices for measuring a product stream are known in the art. Such devices are disclosed for example in German patent documents DE 30 45 728, DE 38 07 492, DE 41 05 857, and U.S. patent documents U.S. Pat. No. 5,318,574 and U.S. Pat. No. 5,173,079. Each of the above mentioned patent documents describe a device for measurement of a product stream. All described methods are performed so as to detect at least relative data through the harvested kproduct quantity. When it is necessary to detect a maximum accurate measuring value (volume weight) such systems lead to faulty measurements (with the exception of U.S. Pat. No. 5,173, 079 and German patent document DE 38 07 492), when fluctuations in the consistency, density, moisture, and other parameters occur. In order to bring the above mentioned systems as close as possible to the actual values, it is therefore necessary to provide parallel control measurements and calibrate the above mentioned measuring systems through the results of the control measurements. The parallel control measurements are however expensive, since the required measuring means are not always available and the measurements take substantial time. The U.S. Pat. No. 5,173,079 document and the German patent document DE 38 07 492 describe measuring systems which detect a real weight. However, this devices occupy substantial mounting space and have an expensive mechanical system when the weight of the throughflowing product stream must be continuously detected.

SUMMARY OF THE PRESENT INVENTION

Accordingly, it is an object of present invention to provide a device for calibrating the measurements of a product stream, which allows a simple calibration of the measuring devices, occupies a minimum mounting space and does not interfere with the throughflowing product stream.

In keeping with these objects and with others which will become apparent hereinafter, one feature of the present invention resides, briefly stated, in a device for calibrating the measurements of a product flow in which the product flow after passing the measuring device is supplied to a calibrating device by deviation of the product stream with a product stream deviating system, and is weighed there.

In accordance with a further embodiment of the present invention, the calibrating process is performed either automatically, for example in defined time rates, with turning-on of the quantity measurement, with an exchange of the transported medium and/or manually.

In accordance with still another feature of the present invention, the deviation of the product stream is performed in dependence on the positions of individual transporting elements of the transporting device, on the transporting speed of the transporting device, and/or for a definite time cycle.

Still another feature of the present invention is that the product stream deviation system has a deviating flap and an actuating device. The actuating device in accordance with another feature of the present invention can be controlled by a microprocessor.

It is a further feature of the present invention that sensors for detection of certain properties of the product stream, for example its moisture, can be arranged in a collecting container so as to measure capacitively the moisture in a full collecting container.

The calibrating device in another embodiment of the invention can be composed of a collecting container which can be filled and emptied, a weighing device and mounting means. Also, in another embodiment of the present invention, the calibrating device and/or the collecting container can be suspended through a cardan connection.

Means for damping the lateral movement of the collecting container can be further provided. Such means can be formed for example by springs.

In accordance with a still further feature of the present invention, the weighing device can be provided with an overloading block for protecting from overloading. Additionally, means can be provided for following the emptying of the collecting container. Also, in accordance with a further embodiment, an additional transporting device can be arranged after the calibrating device for using the full grain tank volume.

In accordance with a method of the present invention, an evaluating electronic system on an agricultural machine is connected both with the calibrating device and a measuring device, the evaluating electronic system compares the weight value detected by the calibrating device with the weight value determined previously for the corresponding product flow quantity by the measuring device, and in the event of deviations of both values from one another the measuring value determined by the measuring device is multiplied by correction factor which eliminates the comparison difference to the value measured by the calibrating device.

With the use of the inventive method, the evaluating electronic system can additionally indicate the weight values detected by the calibrating and measuring devices on an operator panel.

In accordance with another feature of the inventive method, the correction factor determined by the evaluating electronic system can be changeable by an operator panel.

The inventive calibrating method can be combined with any product stream measuring methods of the prior art. In accordance with another feature of the inventive method, for obtaining correct measuring values it is important to filter disturbance influences such as for example the machine movements.

For filtering-out of the disturbance values, the evaluating electronic system can be connected for example with a sensor means for detecting the machine movements, and then the weight values detected by the calibrating device are corrected by a correction factor produced from the measuring data determined by the movement sensor means, or several measurements can be performed and an average value can be determined from the measurement results.

It is advantageous to detect the weight of the collecting container before each filling for a new weighing process. Thereby the evaluating electronic system can determine the correct net weight of the filling product stream by subtraction of the weight of the empty collecting container from the later measuring value, independently from dirtying or product residues in the collecting container.

The inventive device and the inventive method thereby make possible calibration of known measuring devices in a simple, fast and space economical manner without limiting the theoretically possible transporting speeds of a product stream.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
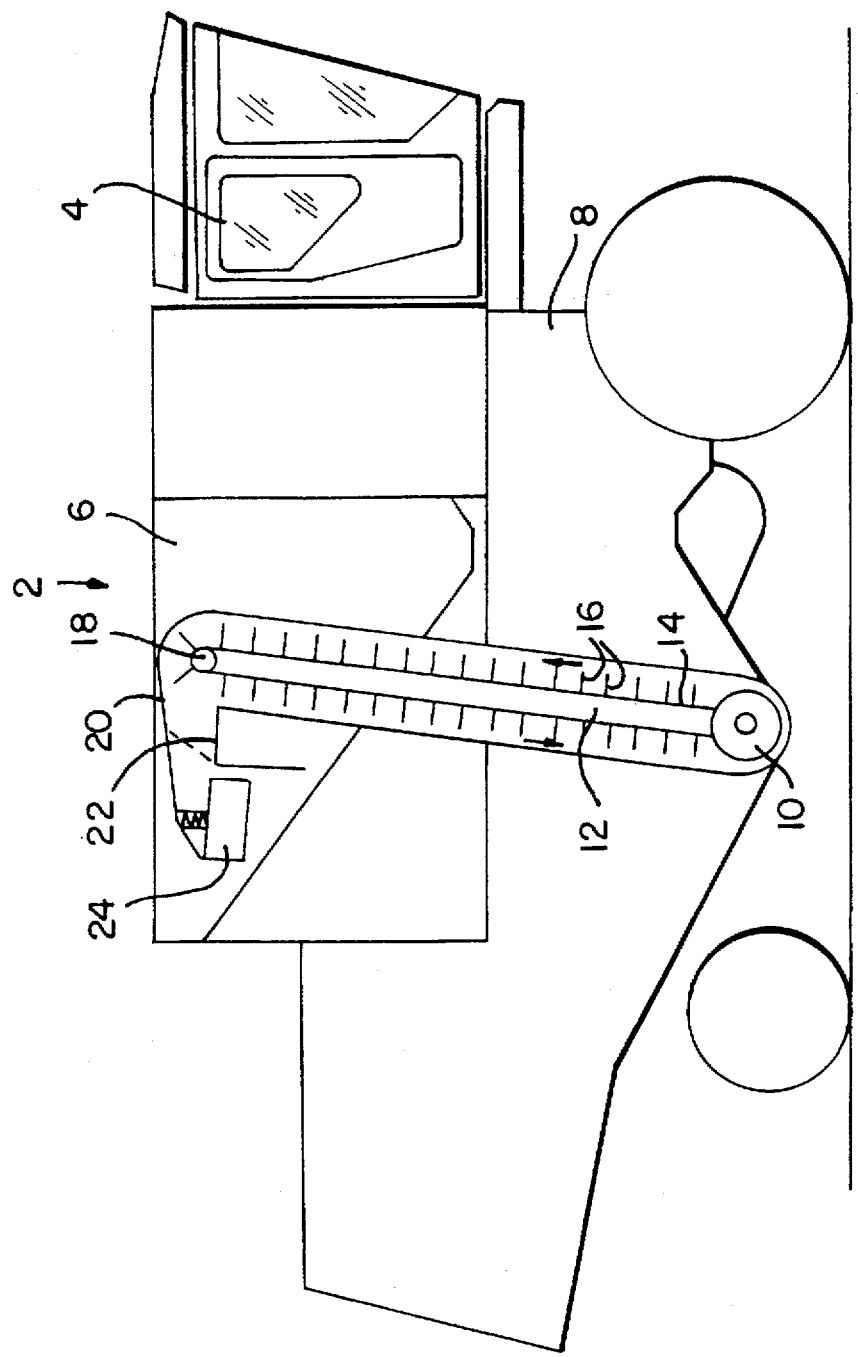
FIG. 1 is a side view showing a harvester thresher with a transporting device.

FIG. 1 shows a harvester thresher identified as a whole with reference numeral 2. A harvester thresher has a driver's cabin 4, a grain tank 6 and a side cover 8 which covers the threshing, separating and cleaning aggregates of the harvester thresher 2. A transporting conveyor 10 transports the threshed and cleaned grains laterally to a transporting device 12. The transporting device 12 transports the harvested product by paddles 16 mounted on a rotatable chain 14, upwards in direction to the grain tank 6.

The grains taken by a paddle 16 are thrown on the upper deviating wheel 18 of the transporting device 12 on an upper limiting wall 20 along in direction of the grain tank 6, or with a lowered flap 22 in direction of a calibrating device 24.

Figure 2:
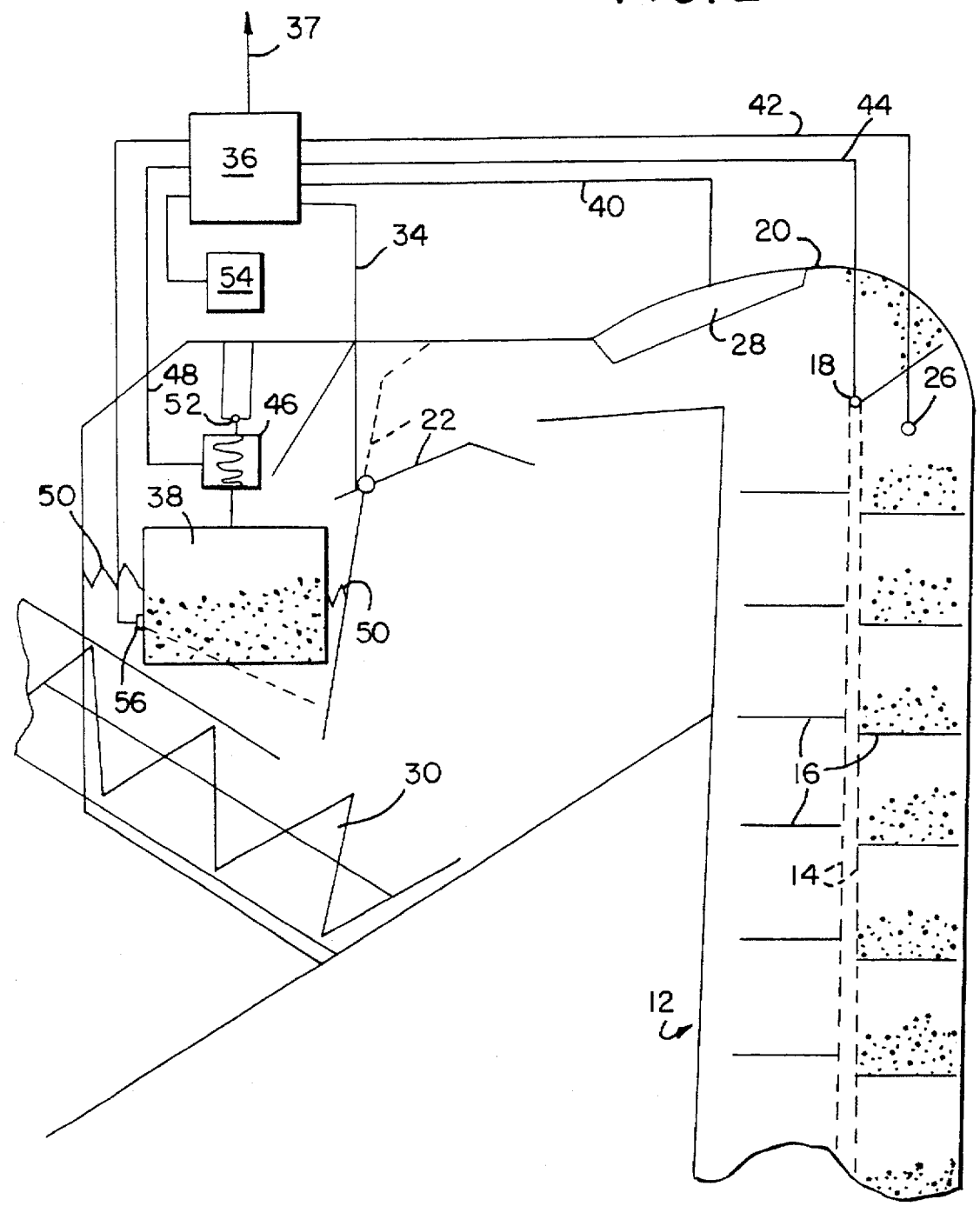
FIG. 2 is a view showing a device for calibrating the measurements of a product flow in accordance with the present invention.

FIG. 2 shows the paddles 16 loaded with grains and thrown from the transporting device 12 during deviation around the deviating wheel 18. In the shown example the quantity of the product stream is detected by an optical sensor 26 and a capacitive sensor 28. In the normal case, the product stream is transported against the lower side of the flap 22 and falls into the grain tank or the conveyor turns of the distributing device 30. When the measuring value of the sensors 26 and 28 must be calibrated, automatically in accordance with predetermined parameters or on manually delivered command, then an adjusting device 32 turns the flap 22 downwardly and opens the supply opening to the calibrating device 24. The turning condition of the flap 22 is transmitted by a conductor 34 to an evaluating electronic device 36. The evaluating electronic device includes at least one microprocessor and a suitable control software. The evaluating electronic device 36 can be connected with an on-board electronic device and operation and communication elements in the driver's cabin 4 through a connection 37. The connection 37 can be formed for example as CAN-Bus connection. The turning command can be transmitted through the conductor 34 to the adjusting device 32.

The product stream is then transported to a collecting container 38. The quantity of the product stream to be transported into the collecting container 38 depends on whether it can be guaranteed at the best that the quantity detected by the sensors 26 and 28 is identical to the quantity collected in the collecting container 38. Therefore, a short pause is needed between the deviation of the second paddle 16 around the deviating wheel 18 for turning the flap 22. The position of the paddle can be detected inductively, derived from the sensors 26 and 28, or determined by a rotary speed sensor on the deviating wheel. The sensors 26, 28, 18 are connected with the evaluating electronic device 37 by conductors 40, 42, 44. The quantity of the product stream to be compared must be selected so that on the one hand it is not too small to cause high deviations in the case of small measuring errors and inaccuracies, and on the other hand it must be not too great to pass in the collecting container so that it does not require this disproportional mounting space.

The calibrating process itself is performed in the following manner:

First, the empty weight of the collecting container 38 is determined. Then, the flap 22 is lowered and the collecting container 38 is filled with a product stream quantity which was measured by the sensors 26 and 28. Then the supply opening is again closed by the flap 22, and the collecting container together with its content is weighed by a weighing device 46. When the weight of the filled collecting container 38 is determined, the bottom of the collecting container 38 opens and it is emptied. The determined weight value is supplied by the weighing device 46 through a conductor 48 to the evaluating electronic system 36. The previously determined empty weight is subtracted either by the weighing device itself or by the evaluating electronic device 36. For obtaining a maximum accurate weight value, all disturbing influences must be filtered out. For this purpose it is advantageous when the lateral movement of the collecting container 38 is reduced, for example by laterally arranged springs. Preferably, a cardan suspension 52 of the collecting container 38 together with the weight device 46 is provided. Also, the evaluating electronic device 36 can detect the movement of the harvester thresher 2 through a connected sensor means 54, and then with a suitable software to filter out the affect of disturbance-relevant movements from the weight value determined by the weighing device 46. Further measuring values can be detected by further sensors 56, for example the moisture, and considered by the evaluating electronic device as a correction factor. If a weight value, despite filtering out of the possible disturbing influences is still improbable, the evaluating electronic device 36 dismisses the determined weight value and releases a new measuring process.

When the weight value determined by the calibrating device 24 is certain, the evaluating electronic device 36 compares it with the measuring value determined by the sensors 26 and 28. If the values coincide, no correction is needed. If however there is a difference between the compared measuring values, then the measuring values of the sensors 26 and 28 and the calibrating device 24 are set in relation with one another. The relation value corresponds then the correction factor with which the error deviation of the measuring value determined by the sensors 26 and 28 is cleared to the correct value. The result of the calibration can be indicated through the conductor 37 to the driver, and the driver itself can change the proposed correction factor by corresponding input devices.

The inventive arrangement can be used practically for calibration of all throughflow measuring systems known in the prior art.

It will be understood that each of the elements described above, or two or more together, may also find a useful application in other types of constructions and methods differing from the types described above.

While the invention has been illustrated and described as embodied in device for and method of calibrating the measurements of a product stream, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for calibrating the measurements of a product stream on an agricultural machine, comprising measuring means for measuring a product stream and producing a first measured weight value; calibrating means; deviating means arranged so that the whole product stream after passing said measuring means is directed by said deviating means to said calibrating means and is weighed in said calibrating means to produce a second weight value; and evaluating means for comparing said first measured weight value with said second weighed weight value.

2. A device as defined in claim 1, wherein said calibrating means is formed so that a calibrating process is started automatically during turning-on of a quantity measurement by said measuring means.

3. A device as defined in claim 1, wherein said calibrating means is formed so that a calibrating process is started automatically during an exchange of a product stream which is transported.

4. A device as defined in claim 1, wherein said calibrating means is formed so that a calibrating process is started automatically in definite time rates.

5. A device as defined in claim 1, wherein said calibrating means is formed so that a calibrating process is started manually.

6. A device as defined in claim 1, wherein said deviating means is formed so that a deviation of the product stream is performed for a defined time cycle.

7. A device as defined in claim 1, wherein said deviating means including a deviating flap and an actuating element acting on said deviating flap.

8. A device as defined in claim 7, and further comprising a microprocessor controlling said actuating element.

9. A device as defined in claim 1, wherein said calibrating means including a collecting container provided with sensor means for detecting properties of the product stream.

10. A device as defined in claim 9, wherein said sensor means include at least one moisture sensor which capacitively determines a moisture value of the product stream when said collecting container is filled.

11. A device as defined in claim 1, wherein said calibrating means include a fillable and emptiable collecting container, weighing means and mounting means.

12. A device as defined in claim 1; and further comprising cardan-type suspending means for suspending said calibrating means.

13. A device as defined in claim 1, wherein said calibrating means include a collecting container for the product stream, and means for cardan-type suspension of said collecting container.

14. A device as defined in claim 1, wherein said calibrating means include a collecting container, and means for damping lateral movements of said collecting container.

15. A device as defined in claim 1, wherein said calibrating means include a collecting container, and weighing means provided with an overload block.

16. A device as defined in claim 1, wherein said calibrating means include a collecting container for the product stream, and means for emptying said collecting container.

17. A device as defined in claim 1; and further comprising transporting means for transporting the product stream from said calibrating means.

18. A device for calibrating the measurements of a product stream on an agricultural machine, comprising measuring means for measuring a product stream; calibrating means; and deviating means arranged so that the product stream after passing said measuring means is directed by said deviating means to said calibrating means and is weighed in said calibrating means; and transporting means for transporting the product stream and including a plurality of transporting elements, said deviating means being formed so that a deviation of the product stream is formed in dependence on positions of individual ones of said transporting elements.

19. A device for calibrating the measurements of a product stream on an agricultural machine, comprising measuring means for measuring a product stream; calibrating means; and deviating means arranged so that the product stream after passing said measuring means is directed by said deviating means to said calibrating means and is weighed in said calibrating means; and a transporting means for transporting the product stream, said deviating means being formed so that a deviation of the product stream is performed in dependence on a transporting speed of said transporting means.

20. A method of calibrating the measurements of a product stream on an agricultural machine, comprising the steps of measuring a product stream in measuring means to determined a first measured weight value; after passing the measuring means, deviating the whole product stream by deviating means; and receiving the deviated product stream by calibrating means and weighing the product stream in the calibrating means to determine a second weighed weight value; and comparing said first measured value with said second weighed value.

21. A method as defined in claim 20, wherein said determining the first weight value by the measuring means includes optical determining of the first weight value.

22. A method as defined in claim 20, wherein said determining the first weight value by the measuring means includes capacitive determining of the first weight value.

23. A method as defined in claim 20, wherein said determining the first weight value by the measuring means includes mechanical determining of the first weight value.

24. A method as defined in claim 20; and further comprising the step of filtering out disturbing influences from the determined weight values.

25. A method as defined in claim 20, wherein said calibrating includes supplying the product stream into a collecting container, determining a weight of the collecting container before filling, and deducting the weight of the collecting container from the second weight value measured by the calibrating means.

26. A method of calibrating the measurements of a product stream on an agricultural machine, comprising the steps of measuring a product stream in measuring means; after passing the measuring means, deviating the product stream by deviating means; and receiving the deviated product stream by calibrating means and weighing the product stream in the calibrating means, said measuring including determined by the measuring means a first weight value, said weighing includes determined by the calibrating means a second weight value; and further comprising the steps of comparing the second weight value and the first weight value by an evaluating electronic device; and in the event of deviation of said weight values from one another, multiplying by the measuring means the first weight value by a correction factor to eliminate a difference between said second weight value determined by the calibrating means and the first weight value determined by the measuring means.

27. A method as defined in claim 26; and further comprising the step of indicating the first weight value determined by the measuring means and the second weight value determined by the calibrating means on an operator panel.

28. A method as defined in claim 26, wherein the correction factor is determined by said evaluating electronic device and is changeable by an operator panel.

29. A method as defined in claim 24; and further comprising filtering out of disturbing influences by the evaluating electronic means, said filtering out including sensing machine movements, determining the correction factor from measuring data obtained by said sensing, and taking into consideration the correction factor in said determining the second weight value by the calibrating means.

30. A method as defined in claim 26; and further comprising the step of filtering out disturbing influences by the evaluating electronic means, said filtering out including performing successive measurements of the weight values by the evaluating electronic means and statistically averaging the thusly determined values.

* * * * *